(12) United States Patent
Lee et al.

(10) Patent No.: US 11,206,697 B2
(45) Date of Patent: *Dec. 21, 2021

(54) NETWORK-INITIATED PDU SESSION CONNECTION UPDATE METHOD BETWEEN TERMINAL AND NETWORK

(71) Applicant: Samsung Electronics Co., Ltd., Gyeonggi-do (KR)

(72) Inventors: Hoyeon Lee, Seoul (KR); Jungje Son, Gyeonggi-do (KR); Youngkyo Baek, Seoul (KR); Jinsung Lee, Gyeonggi-do (KR); Sunghoon Kim, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/868,996

(22) Filed: May 7, 2020

(65) Prior Publication Data
US 2020/0267781 A1 Aug. 20, 2020

Related U.S. Application Data

(63) Continuation of application No. 15/923,672, filed on Mar. 16, 2018, now Pat. No. 10,939,478.

(30) Foreign Application Priority Data

Mar. 16, 2017 (KR) .................. 10-2017-0033379
Apr. 28, 2017 (KR) .................. 10-2017-0055349

(51) Int. Cl.
*H04W 4/00* (2018.01)
*H04W 76/10* (2018.01)
(Continued)

(52) U.S. Cl.
CPC .......... *H04W 76/10* (2018.02); *H04W 48/16* (2013.01); *H04W 48/18* (2013.01); *H04W 72/0406* (2013.01); *H04W 76/30* (2018.02)

(58) Field of Classification Search
CPC ..... H04W 76/10; H04W 76/30; H04W 48/16; H04W 48/18; H04W 72/0406
See application file for complete search history.

(56) References Cited

U.S. PATENT DOCUMENTS

2010/0165937 A1  7/2010  Yi et al.
2010/0330921 A1  12/2010  Kim
(Continued)

FOREIGN PATENT DOCUMENTS

CN    102265700    11/2011

OTHER PUBLICATIONS

U.S. Office Action dated Jul. 27, 2020 issued in counterpart U.S. Appl. No. 15/923,672, 16 pages.
(Continued)

*Primary Examiner* — Abdelnabi O Musa
(74) *Attorney, Agent, or Firm* — The Farrell Law Firm P.C.

(57) ABSTRACT

The present disclosure relates to a communication scheme and system for converging a $5^{th}$ generation (5G) communication system for supporting a data rate higher than that of a $4^{th}$ generation (4G) system with an internet of things (IoT) technology. The present disclosure is applicable to intelligent services (e.g., smart homes, smart buildings, smart cities, smart cars, connected cars, health care, digital education, retails, and security and safety-related services) based on the 5G communication technology and the IoT-related technology. The present disclosure provides a method for managing a data transmission connection of a PDU session for data communication between a terminal and a network based on a determination made by the network in a mobile communication system.

20 Claims, 16 Drawing Sheets

(51) Int. Cl.
  *H04W 48/16* (2009.01)
  *H04W 72/04* (2009.01)
  *H04W 76/30* (2018.01)
  *H04W 48/18* (2009.01)

(56) References Cited

U.S. PATENT DOCUMENTS

| | | | |
|---|---|---|---|
| 2017/0339609 A1 | 11/2017 | Youn | |
| 2018/0199398 A1* | 7/2018 | Dao | H04L 65/1069 |
| 2018/0220479 A1 | 8/2018 | Shu | |
| 2018/0227743 A1 | 8/2018 | Faccin | |
| 2018/0270778 A1 | 9/2018 | Bharatia | |
| 2019/0007921 A1 | 1/2019 | Schliwa-Bertling | |
| 2019/0357129 A1* | 11/2019 | Park | H04W 60/00 |
| 2020/0120570 A1* | 4/2020 | Youn | H04W 36/0033 |

OTHER PUBLICATIONS

Huawei, HiSilicon, "TS 23.501 : Interaction Between the AMF and SMF When the UE Enters CM-IDLE State", S2-1701040, 3GPP TSG SA WG2 Meeting #119, Feb. 13-17, 2017, 1 page.
Catt, "SMF and UPF Interactions", S2-171155, SA WG2 Meeting #S2-119, Feb. 13-17, 2017, 2 pages.
Samsung, ETRI, "Update of Solution 4.21 & 4.22 Relating to Paging", S2-165730, SA WG2 Meeting #117, Oct. 19-23, 2016, 10 pages.
3GPP, 3rd Generation Partnership Project; Technical Specification Group Services and System Aspects; System Architecture ofr the 5G System; Stage 2, (Release 15), 3GPP TS 23.501 V0.3.1, Mar. 2017, 97 pages.
International Search Report dated Jun. 20, 2018 issued in counterpart application No. PCT/KR2018/003086, 9 pages.
LG Electronics, "Update of Solution 4.22 and Interim Agreement", S2-166612, SA WG2 Meeting #118, Nov. 14-18, 2016, 11 pages.
Samsung, "A New Solution for Local Area Data Network", S2-165286, SA WG2 Meeting #S2-116BIS, Aug. 29-Sep. 2, 2016, 6 pages.
China Mobile, "Proposal on Session Release and Deactivation Procedures", S2-161702, SA WG2 Meeting #114, Apr. 11-15, 2016, 3 pages.
Qualcomm Incorporated et al., "TS 23.501 : PDU Sessions Handling for LADNs", S2-173987, SA WG2 Meeting #121, May 15-19, 2017, 5 pages.
European Search Report dated Nov. 25, 2019 issued in counterpart application No. 18768110.1-1214, 11 pages.
ZTE et al., "Proposed Network Slicing Update to 23.501 Clause 5.13", S2-170324, SA WG2 Meeting #118bis, Jan. 16-20, 2017, 4 pages.
Samsung, SK Telecom, "TS 23.501: PLMN-specific NSSAI", S2-171891, SA WG2 Meeting #120, Mar. 27-31, 2017, 5 pages.
Chinese Office Action dated Oct. 11, 2021 issued in counterpart application No. 201880017950.1, 16 pages.
European Search Report dated Sep. 23, 2021 issued in counterpart application No. 21176481.6-1212, 11 pages.

* cited by examiner

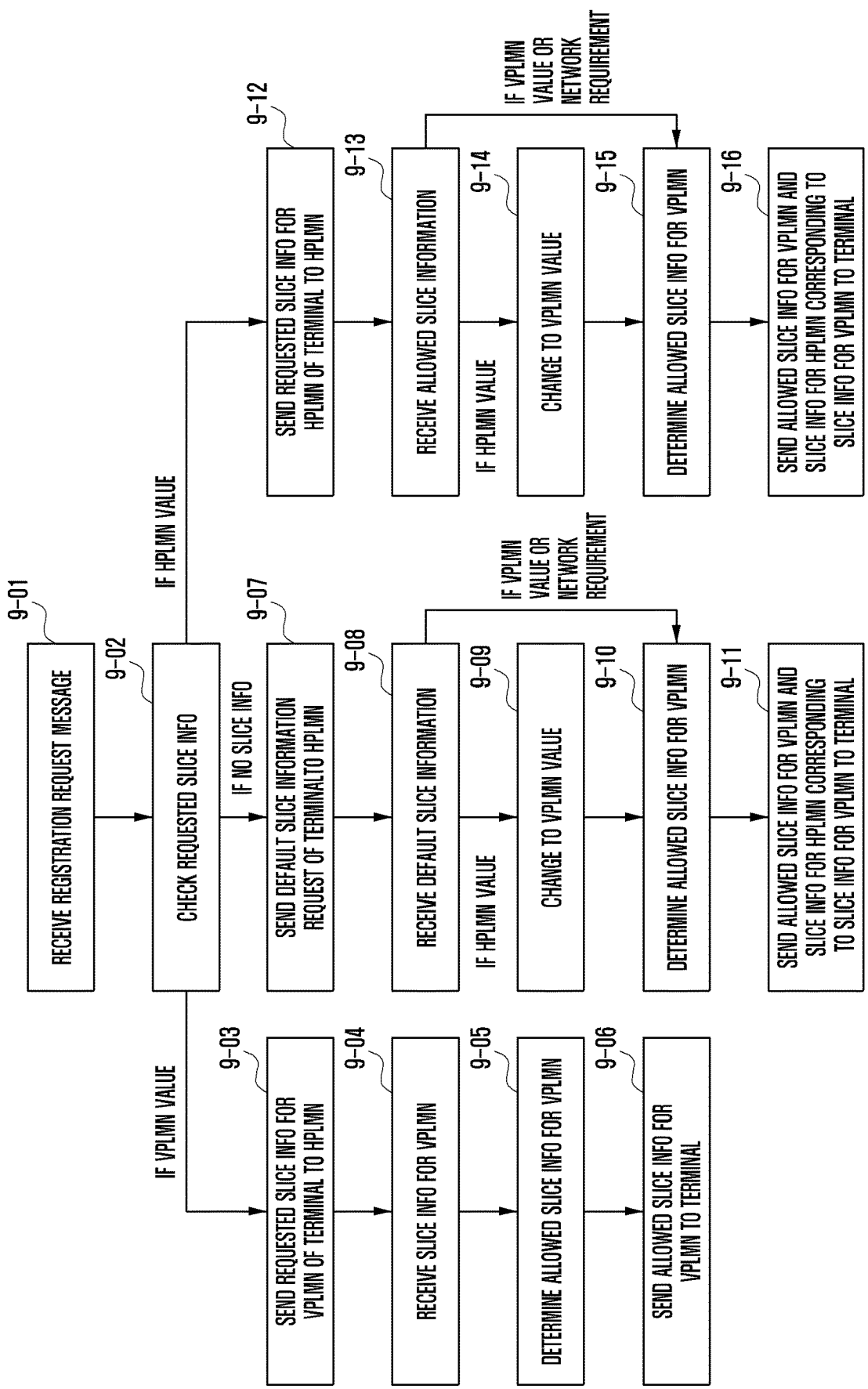

NETWORK-INITIATED PDU SESSION CONNECTION UPDATE METHOD BETWEEN TERMINAL AND NETWORK

CROSS-REFERENCE TO RELATED APPLICATION(S)

This application is a Continuation of Ser. No. 15/923,672, which was filed in the U.S. Patent and Trademark Office on Mar. 16, 2018, and claims priority under 35 U.S.C. § 119 to Korean Patent Application Nos. 10-2017-0033379 and 10-2017-0055349, which were filed in the Korean Intellectual Property Office on Mar. 16, 2017 and Apr. 28, 2017, respectively, the entire disclosure of each of which is incorporated herein by reference.

BACKGROUND

1. Field

The present disclosure relates generally to a method for controlling data transmission connection in a protocol data unit (PDU) session for data communication between a terminal and a network according to a determination made by the network in a mobile communication system.

2. Description of the Related Art

In order to meet the increasing demand for wireless data traffic since the commercialization of $4^{th}$ generation (4G) communication systems, development focus is on a $5^{th}$ generation (5G) or pre-5G communication system. The 5G or pre-5G communication system is also referred to as a beyond 4G network communication system or post long-term evolution (LTE) system. To accomplish higher data rates, implementation of the 5G communication system in millimeter wave (mmWave) frequency bands (e.g., 60 GHz bands) is being considered. In order to increase the propagation distance by mitigating propagation loss in the 5G communication system, various techniques, such as beamforming, massive multiple-input multiple output (MIMO), full dimensional MIMO (FD-MIMO), array antenna, analog beamforming, and large-scale antenna, are being discussed.

In order to enhance network performance of the 5G communication system, various techniques, such as evolved small cell, advanced small cell, cloud radio access network (RAN), ultra-dense network, device-to-device (D2D) communication, wireless backhaul, moving network, cooperative communication, coordinated multi-point (CoMP), and interference cancellation, are being developed. Further, ongoing research includes the use of hybrid frequency shift keying (FSK) and quadrature amplitude modulation (QAM) (FQAM) and sliding window superposition coding (SWSC) as advanced coding modulation (ACM), filter bank multi-carrier (FBMC), non-orthogonal multiple access (NOMA), and sparse code multiple access (SCMA).

The Internet is evolving from a human-centric communication network in which information is generated and consumed by humans to the Internet of things (IoT) in which distributed things or components exchange and process information. The combination of the cloud server-based Big data processing technology and the IoT brings Internet of everything (IoE) technology. In order to secure the sensing technology, wired/wireless communication and network infrastructure, service interface technology, and security technology required for implementing the IoT, recent research has focused on sensor network, machine-to-machine (M2M), and machine-type communication (MTC) technologies. In the IoT environment, it is possible to provide an intelligent Internet Technology that collects and analyzes data generated from connected things to create new values for human life. The IoT can be applied to various fields, such as a smart home, a smart building, a smart city, a smart car or a connected car, a smart grid, health care, a smart appliance, and a smart medical service through legacy information technology (IT) and convergence of various industries.

Thus, there are various attempts to apply the IoT to the 5G communication system. For example, the sensor network, M2M, and MTC technologies are implemented using G communication technologies such as beamforming, MIMO, and an array antenna. The application of the aforementioned cloud RAN as a big data processing technology is an example of a convergence between the 5G and IoT technologies.

Recently, research has been conducted on advanced technologies for mobile communication systems in line with the continued evolution of LTE and LTE-Advanced (LTE-A); and, in particular, there is a need in a mobile communication system of a method and apparatus for controlling a data transmission link of a PDU session for data communication between a terminal and a network according to a determination made by the network.

SUMMARY

An aspect of the present disclosure is to provide a method for managing a user plane network function associated with a PDU session for data transmission of a terminal, connection status between a base station and the terminal, and PDU session status of the terminal according to a determination made by the user plane network function or a session management network function in a mobile communication system including the user plane network function, which is responsible for data transmission/reception in the PDU session for data transmission with the terminal, the session management network function, which is responsible for controlling the user plane network function, and a base station apparatus for data transmission over a wireless link.

Another aspect of the present disclosure is to define network slices including network resources that meet service-specific requirements in a 5G mobile communication system. A mobile communication operator may define service-specific network slices.

Another aspect of the present disclosure is to provide a method for supporting an operator-specific network slice in a roaming network.

In accordance with an aspect of the present disclosure, a method is provided for an access management function (AMF) entity of a visited public land mobile network (VPLMN) in a wireless communication system. The method includes receiving, from a terminal, a registration request message including information on at least one requested network slice selection assistance information (NSSAI) associated with a home public land mobile network (HPLMN); determining at least one allowed NSSAI associated with the VPLMN of the at least one requested NSSAI associated with the HPLMN; and transmitting, to the terminal, a registration accept message as a response to the registration request message, the registration accept message including information on the at least one allowed NSSAI associated with the VPLMN.

In accordance with an aspect of the present disclosure, a method is provided for a terminal in a wireless communication system. The method includes transmitting, to a access management function (AMF) entity of a visited public land mobile network (VPLMN), a registration request message including information on at least one requested network slice selection assistance information (NSSAI) associated with a home public land mobile network (HPLMN); and receiving, from the AMF entity, a registration accept message as a response to the registration request message, the registration accept message including information on at least one allowed NSSAI associated with the VPLMN of the at least one requested NSSAI associated with the HPLMN.

In accordance with an aspect of the present disclosure, an access management function (AMF) entity is provided for a visited public land mobile network (VPLMN) in a wireless communication system. The AMF entity includes a transceiver; and a controller configured to receive, from a terminal, via the transceiver, a registration request message including information on at least one requested network slice selection assistance information (NSSAI) associated with a home public land mobile network (HPLMN), determine at least one allowed NSSAI associated with the VPLMN of the at least one requested NSSAI associated with the HPLMN, and transmit, to the terminal, via the transceiver, a registration accept message as a response to the registration request message, the registration accept message including information on the at least one allowed NSSAI associated with the VPLMN.

In accordance with an aspect of the present disclosure, a terminal is provide for use in a wireless communication system. The terminal includes a transceiver; and a controller configured to transmit, to a access management function (AMF) entity of a visited public land mobile network (VPLMN), via the transceiver, a registration request message including information on at least one requested network slice selection assistance information (NSSAI) associated with a home public land mobile network (HPLMN), and receive, from the AMF entity, via the transceiver, a registration accept message as a response to the registration request message, the registration accept message including information on at least one allowed NSSAI associated with the VPLMN of the at least one requested NSSAI associated with the HPLMN.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 9 is a flowchart illustrating an operation of a visited public land mobile network (VPLMN) network function (NF) according to an embodiment;

DETAILED DESCRIPTION

Figure 1:
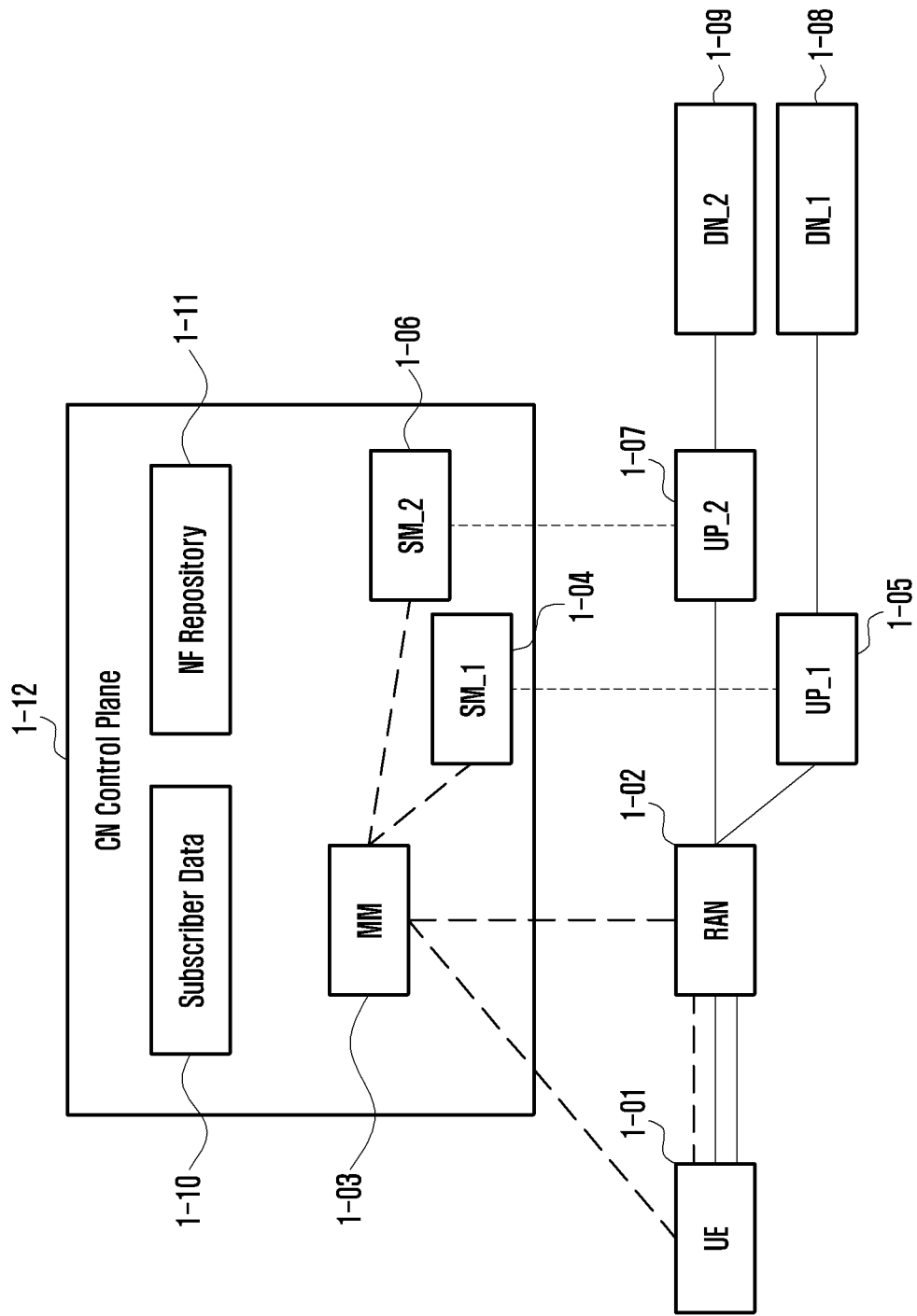
FIG. 1 illustrates a network architecture of a mobile communication system according to an embodiment.

Embodiments of the present disclosure are described in detail with reference to the accompanying drawings. Detailed descriptions of well-known functions and structures incorporated herein may be omitted to avoid obscuring the subject matter of the present disclosure. Further, the following terms are defined in consideration of the functionality in the present disclosure, and they may vary according to the intention of a user or an operator, usage, etc. Therefore, the definitions of the terms should be made on the basis of the overall content of the present specification.

Advantages and features of the present disclosure and methods of accomplishing the same may be understood more readily by reference to the following detailed description of the embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art.

Like reference numerals may refer to like elements throughout the specification.

First Embodiment

The operation principle of the embodiments of the present invention is described in detail with reference to the accompanying drawings. Detailed descriptions of well-known functions and structures incorporated herein may be omitted to avoid obscuring the subject matter of the present invention. Furthermore, terms used herein are defined by taking functions of the present invention into account and can be changed according to the practice or intention of users or operators. Therefore, definition of the terms should be made according to overall disclosures set forth herein.

In the following description, the terms indicating various access nodes, network entities, messages, interfaces between network entities, and information items are used for convenience of explanation of the present disclosure. Accordingly, the terms used in the following description are not limited to specific meanings, and they may be replaced by other terms that are equivalent in technical meanings.

In the following descriptions, the terms and definitions given in the 3GPP LTE standards are used for convenience of explanation. However, the present disclosure is not limited by these terms and definitions, and may be applied to other systems abiding by different standards in the same or similar manner.

FIG. 1 illustrates a network architecture of a mobile communication system according to an embodiment.

Referring to FIG. 1, the mobile communication system includes a terminal (or a UE) 1-01, a base station (or a RAN) 1-02, a core network (CN) control plane (or CN control function) 1-12, and user plane (UP) functions UP_1 1-05 and UP_2 1-07. The CN control function 1-12 includes a mobility management (MM) function 1-03, session management (SM) functions SM_1 1-04 and SM_2 1-06, subscriber data 1-10, and an NF repository 1-11.

In the mobile communication system, a set of the entities including the control functions and user plane function, with the exception of the UE and base station, is referred to as a CN. The mobile communication system receives service data associated with an external service through data networks (DNs) DN_1 1-08 and DN_2 1-09 for interworking with an external application.

The base station 1-02 provides terminals with a radio access service. That is, the base station 1-02 performs scheduling to allocate radio resources to users for establishing connections between the terminals and a CN for a traffic service.

The MM function 1-03 performs a terminal mobility management function and sends the terminal 1-01 a control signal related to mobility management via the base station 1-02.

The SM_1 1-04 and SM_2 1-06 manage a session for providing the terminal 1-01 with a service via a data network (NW) and communicate with the UP_1 1-05 and the UP_2 1-07, respectively, to manage service data transmission for the terminal 1-01.

The UP_1 1-05 and the UP_2 1-07 process packets that arrive from the base station 1-02 and that are to be transmitted to the base station 1-02.

A connection established between the CN control function 1-12 and the terminal 1-01 for exchanging control signals is referred to as an NG1 connection.

A connection established between the CN control function 1-12 and the base station 1-02 for exchanging control signals is referred to as an NG2 connection. The packets exchanged through the NG1 connection between the terminal 1-01 and the CN control function 1-12 are transmitted through a radio link between the terminal 1-01 and the base station 1-02 and then through the NG2 connection between the base station and the CN control function.

A connection established between the UP_1 1-05 and the UP_2 1-07 and the base station 1-02 for exchanging packets with the terminal 1-01 is referred to as an NG3.

The mobile communication system may perform data communication with the DN_1 1-08 and the DN_21-09 via the UP_1 1-05 and the UP_2 1-07 to provide the terminal 1-01 with various types of external services. Here, the DN_1 1-08 and the DN_2 1-09 may exchange data with the terminal 1-01 via the UP_1 1-05 and the UP_2 1-07, respectively.

In this case, it may be possible to control the UP_1 1-05 for connections with the terminal 1-01 and the base station 1-02 by using the SM_1 1-04. It may also be possible to control the UP_2 1-07 for connections with the terminal 1-01 and the base station 1-02 by using the SM_2 1-06. Here, the connections for exchanging control signals between the terminal 1-01 and the SM_1 1-04 and the SM_2 1-06 may be established through the NG1 connection between the MM function 1-03 and the terminal 1-01. Also, the connections for exchanging control signals between the base station 1-02 and the SM_1 1-04 and the SM_2 1-06 may be established through the NG2 connection between the MM function 1-03 and the base station 1-02.

The MM function 1-03 sends the SM_1 1-04 or the SM_2 1-06 a signaling message for a PDU connection configuration with the SM_1 1-04 or the SM_2 1-06, the message being received from the terminal 1-01. Here, the MM function 1-03 selects an appropriate SM function, i.e., the SM_1 1-04 or the SM_2 1-06, for processing the PDU connection configuration received from the terminal 1-01 and sends a PDU connection configuration message to the selected SM function.

Figure 2:
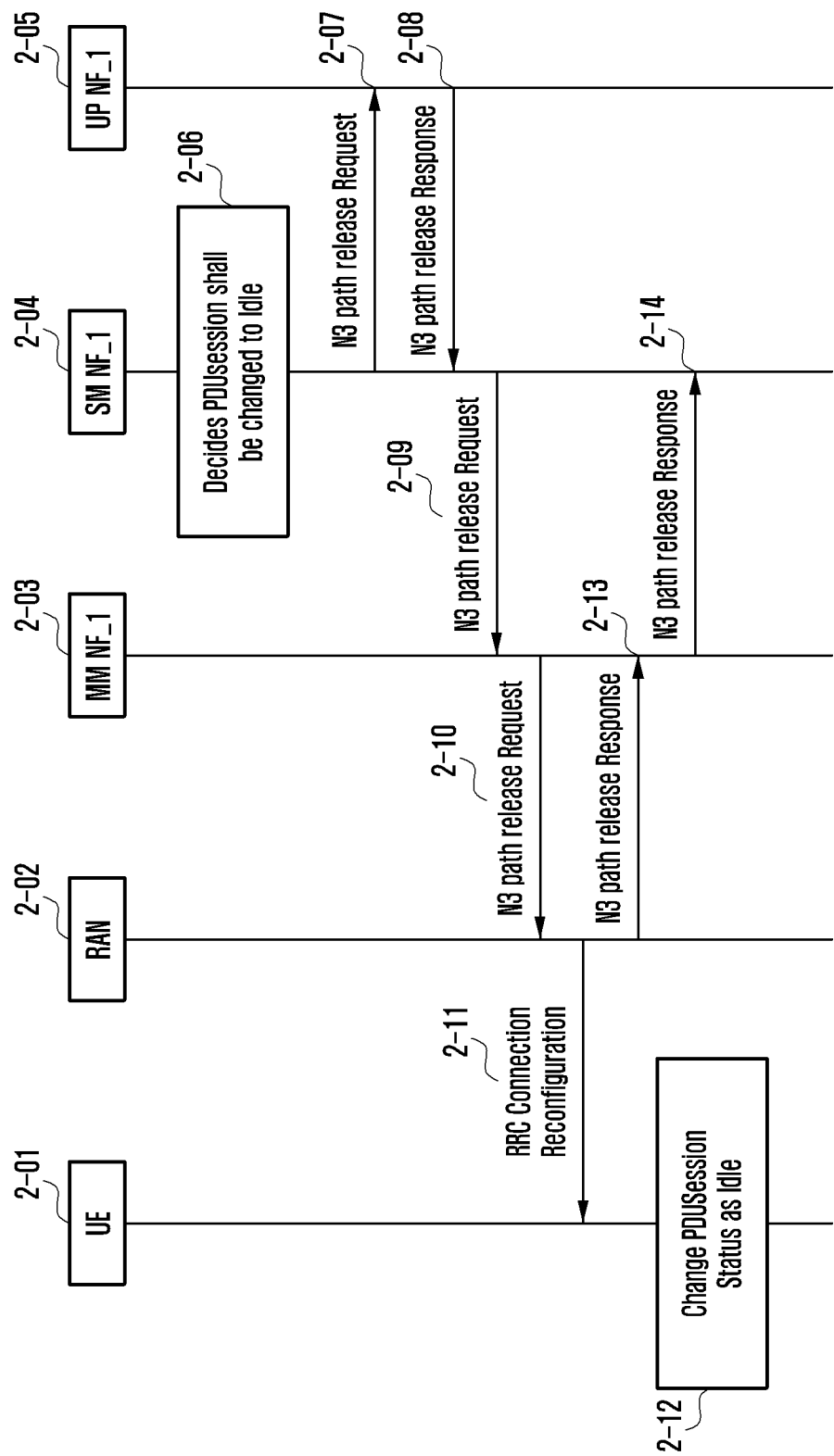
FIG. 2 is a signal flow diagram illustrating a procedure for setting a PDU session state of a terminal and a base station to IDLE and releasing a user plane connection based on a determination made by an SM network function according to an embodiment.

FIG. 2 is a signal flow diagram illustrating a procedure for setting a PDU session state of a terminal and a base station to IDLE and releasing a user plane connection based on a determination made by an SM network function according to an embodiment.

Referring to FIG. 2, when it is predicted that there will be no data transmission to a terminal 2-01 in the PDU session for a predetermined time, the SM NF_1 (hereinafter, referred to as SM) 2-04 determines to change a state of the PDU session to IDLE at step 2-06. The condition for determining the change of the state of the PDU session to IDLE may be 1) where no data transmission/reception occurs at the UP NF_1 (hereinafter, referred to as UP) 2-05 in the PDU session for a predetermined time, 2) the PDU session is possible in a predetermined range but the terminal 2-01 is out of the service range of the PDU session, 3) the terminal 2-01 is out of the data service range of the mobile communication system, 4) the terminal 2-01 approaches an area in which service data transmission/reception is prohibited, or 5) it is difficult for the SM 2-04 to perform data transmission/reception in the PDU session.

After determining to change the state of the PDU session to the idle state, the SM 2-04 sends to the UP 2-05, at step 2-07, an N3 path release request for releasing a connection between the UP 2-05 and the base station 2-02 for PDU session-related data transmission to the UP 2-05. The N3 path release request may include information indicating the PDU session such as PDU session identifier (ID).

When the UP 2-05 receives PDU session-related data, the N3 path release request transmitted from the SM 2-04 to the UP 2-05 may include PDU session-related packet discard information instructing the UP to discard the PDU session-related data, before receipt of any other request, or information instructing the UP 2-05 to transmit downlink data notification notifying the SM 2-04 of the receipt of the data.

In response to receiving the N3 path release request at step 2-07, the UP 2-05 releases the connection with the base station 2-02 and sends the SM 2-04 an N3 path release response at step 2-08. The UP 2-05 may discard information for managing the PDU session when releasing the PDU session-related connection.

When the N3 path release request received from SM 2-04 at step 2-07 includes the PDU session-related packet discard information, the UP 2-05 may determine whether to discard the data received from the outside or transmit a downlink data notification notifying the SM 2-04 of the receipt of the data based on the packet discard-related information and then process the data.

Upon receipt of the N3 path release response from the UP 2-05 at step 2-08, the SM 2-04 sends, at step 2-09, the N3 path release request to the MM NF_1 (hereinafter, referred to as MM) 2-03 for releasing the PDU session-related connection between the base station 2-02 and the UP 2-05.

Upon receipt of the N3 path release request from the SM 2-04, the MM 2-03 transmits, at step 2-10, the N3 path release request to the base station 2-02 to which the terminal 2-01 is connected, in order to request a release of the PDU session-related connection.

Upon receipt of the N3 path release request from the MM 2-03, the base station 2-02 may release the PDU session-related connection with the UP 2-05 and remove the information for releasing the radio resource link and controlling the PDU session.

At step 2-11, the base station 2-02 sends the terminal 2-01 an RRC connection reconfiguration message to notify the terminal 2-01 of the release of the PDU session-related radio resource link.

If the RRC connection reconfiguration message notifying the PDU session-related radio resource link release is received from the base station 2-02, the terminal 2-01 assumes that the PDU session-related connection is disconnected and manages the PDU session in the idle state. In order for the terminal 2-01 to transmit data through the PDU session in the idle state, the terminal 2-01 requests the base station 2-02 and the MM 2-03 for reconfiguration of the radio link and the connection to the UP 2-05 for data transmission through the PDU session.

At step 2-13, the base station 2-02 releases the connection for the PDU session and sends the N3 path release response to notify the MM 2-03 of the connection release.

Upon receipt of the N3 path release response from the base station 2-02, the MM 2-03 sends, at step 2-14, the N3 path release response to the SM 2-04 to notify the SM 2-04 of the release of the connection for the PDU session between the base station 2-02 and the UP 2-05.

Alternatively, the SM 2-04 may send the N3 path release request to the UP 2-05, after transmitting the N3 path release request to the MM 2-03 to request for releasing the PDU session-related connection with the base station 2-02 and receiving the N3 path release response from the MM 2-03 in reply.

Figure 3:
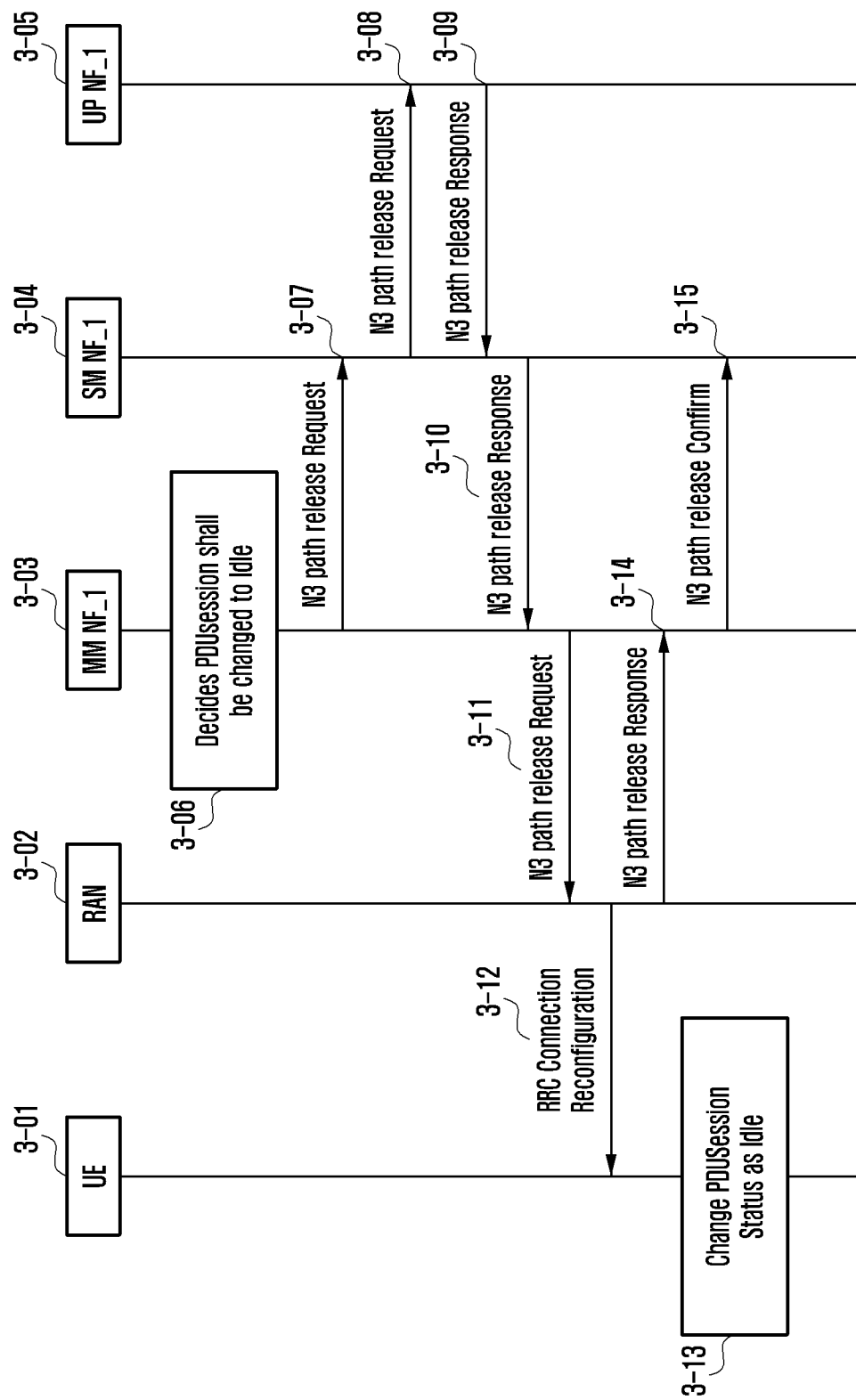
FIG. 3 is a signal flow diagram illustrating a procedure for setting a PDU session state of a terminal and a base station to IDLE and releasing a user plane connection based on a determination made by an MM network function according to an embodiment.

FIG. 3 is a signal flow diagram illustrating a procedure for setting a PDU session state of a terminal and a base station to IDLE and releasing a user plane connection based on a determination made by an MM network function according to an embodiment.

Referring to FIG. 3, if it is determined that a service to a terminal 3-01 through the PDU session is temporarily impossible, e.g., that the terminal 3-01 is out of the service range of the PDU session, the MM 3-03 may determine, at step 3-06, to set the state of the PDU session to IDLE.

At step 3-07, the MM 3-03 sends an N3 path release request to request the SM 3-04 for releasing the PDU session. The MM 3-03 may notify the SM 3-04 that the PDU session service is not available, by using the N3 path release request, when the terminal 3-01 enters an area where the data service is not provided, e.g., the terminal 3-01 is out of the service range of the PDU session.

Upon receipt of the N3 path release request, the SM 3-04 sends, at step 3-08, the N3 path release request to a UP 3-05 to release the connection established between the UP 3-05 and the base station 3-02 for PDU session-related data communication. The N3 path release request may include the information for identifying the PDU session, such as PDU session ID.

When the UP 3-05 receives the PDU session-related data from the outside, the N3 path release request transmitted from the SM 3-04 to the UP 3-05 may include PDU session-related packed discard information instructing the UP 3-05 to transmit downlink data notification notifying the SM 3-04 of the receipt of the data or to discard data before receipt of any other request.

The PDU session-related packet discard information may be configured according to several conditions including receipt of the information indicating unavailability of the PDU session service in the N3 path release request transmitted from the SM 3-04 to the MM 3-03 and operator's policy configured to the SM 3-04.

Upon receipt of the N3 path release request, the UP 3-05 releases the connection between the UP 3-05 and the base station 3-02 and sends the SM 3-04 a N3 path release response at step 3-09. Here, the UP 3-05 may discard the information for managing the PDU session when releasing the PDU session-related connection.

When the N3 path release request received from the SM 3-04 includes the PDU session-related packet discard information, the UP 3-05 may determine whether to discard the data received from the outside or transmit a downlink data notification message-notifying the SM 3-04 of the receipt of the data based on the packet discard-related information and then process the data.

Upon receipt of the N3 release response from the UP 3-05 at step 3-09, the SM 3-04 sends, at step 3-10, the N3 path release response to notify the MM 3-03 that the UP 3-05 has released the PDU session-related connection.

Upon receipt of the N3 path release response from the SM 3-04, the MM 3-03 may sends to the base station 3-02 to which the terminal 3-01 is connected, at step 3-11, the N3 path release request to request the release of the PDU session-related connection.

If the N3 path release request is received from the MM 3-03, the base station 3-02 may release the PDU session-related connection with the UP 3-05 and remove the information necessary for releasing the radio resource link and controlling the PDU session.

The base station 3-02 sends to the terminal 3-01, at step 3-12, an RRC connection reconfiguration message to notify the terminal 3-01 of the release of the PDU session-related radio resource link.

If the RRC connection reconfiguration message notifying the PDU session-related radio resource link release is received from the base station 3-02, the terminal 3-01 assumes that the PDU session-related connection is disconnected and manages the PDU session in the idle state. In order for the terminal 3-01 to transmit data through the PDU session in the idle state, the terminal 3-01 requests the base station 3-02 and MM 3-03 for reconfiguration of the radio link and the connection to the UP 3-05 for data transmission through the PDU session.

The base station 3-02 releases the connection for the PDU session and sends, at step 3-14, the N3 path release response to notify the MM 3-03 of the connection release.

Upon receipt of the N3 path release response from the base station 3-02, the MM 3-03 sends, at step 3-15, the N3 path release response to the SM 3-04 to notify the SM 3-04 of the release of the connection for the PDU session between the base station 3-02 and the UP 3-05.

Alternatively, the MM 3-03 may send the N3 path release request to the SM 3-04, after transmitting the N3 path release request to the base station 3-02 to request for releasing the PDU session-related connection and receiving the N3 path releasing response from the base station 3-02 in reply.

Figure 4:
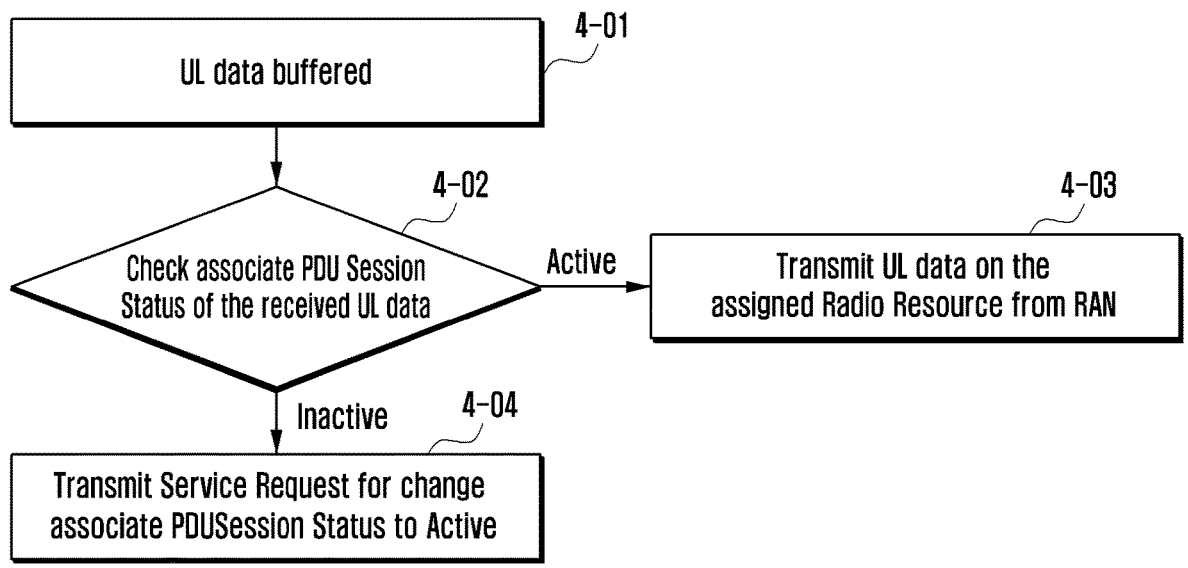
FIG. 4 is a flowchart illustrating a procedure for managing a PDU connection configuration in a terminal for data processing according to an embodiment.

FIG. 4 is a flowchart illustrating a procedure for managing a PDU connection configuration in a terminal for data processing of the terminal according to an embodiment.

Referring to FIG. 4, the terminal detects data generated by an application running in the terminal and receives a request for transmitting the data to the mobile communication system. At step 4-01, uplink (UL) data to be transmitted from the terminal to the network may be buffered.

At step 4-02, the terminal checks the PDU session status to determine whether a PDU session associated with the generated data is maintaining a valid radio access connection to the network, i.e., whether the PDU session status is active or inactive.

If the PDU session associated with the data has the valid radio access connection at step 4-02, i.e., the PDU session status is active, the terminal is assigned resources through the radio access connection to transmit the data at step 4-03.

If the PDU Session associated with the data does not have a valid radio access connection, i.e., the PDU session status is inactive, the UE transmits a service request to the network to change the PDU Session to an active state at step 4-04.

In the embodiments of the present inventions, the components are described in singular or plural forms depending on the embodiment. However, the singular and plural forms are selected appropriately for the proposed situation just for explanatory convenience without any intention of limiting the present invention thereto; thus, the singular form includes the plural forms as well, unless the context clearly indicates otherwise.

Although the description has been made with reference to particular embodiments, the present invention can be implemented with various modifications without departing from the scope of the present invention. Thus, the present invention is not limited to the particular embodiments disclosed, and it will include the following claims and their equivalents.

Second Embodiment

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Although the description is mainly directed to the communication standards standardized by 3GPP, it will be understood by those skilled in the art that the present invention can be applied to other communication systems having a similar technical background and channel format, with a slight modification, without departing from the spirit and scope of the present invention.

In the following descriptions of the embodiments of the present disclosure, the terms "slice," "service," "network slice," "network service," "application slice," and "application service" are interchangeably used.

The term "slice information (slice info)" denotes network slice selection assistance information (NSSAI) or single NSSAI (S-NSSAI). The NSSAI is a collection of S-NSSAI. The slice info for an HPLMN denotes the slice information value determined by the HPLMN mobile communication operator, i.e., NSSAI or S-NSSAI available in the HPLMN. The slice info for a VPLMN denotes the slice information value determined by a VPLMN mobile communication operator, i.e., NSSAI or S-NSSAI available in the VPLMN.

A mobile communication operator may designate a CN node appropriate for a service per slice or a set of slices.

Figure 5:
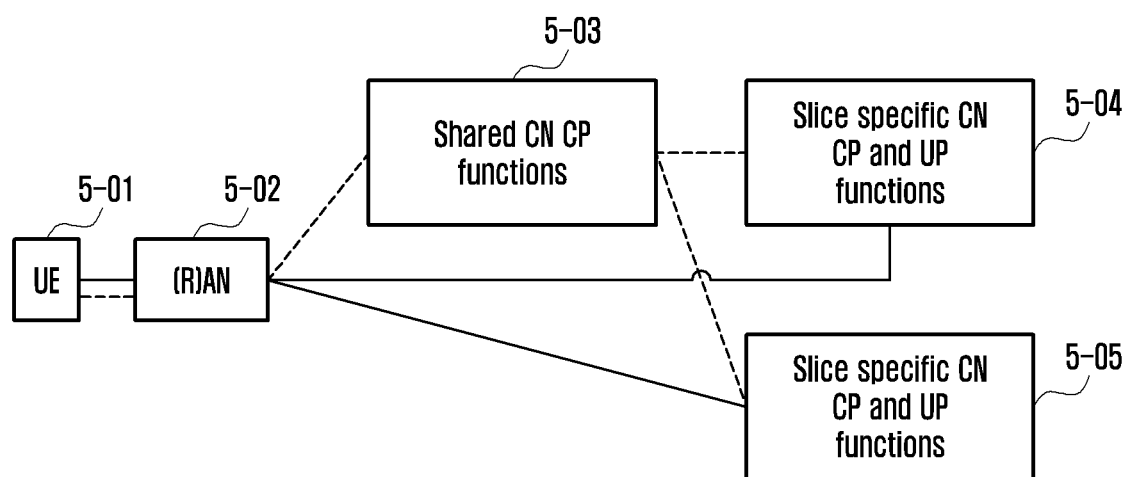
FIG. 5 illustrates a network architecture according to an embodiment.

FIG. 5 illustrates a network structure according to an embodiment.

Referring to FIG. 5, a terminal 5-01 may access a $3^{rd}$ generation partnership project (3GPP) 5G CN via a RAN 5-02 specified in the 3GPP standard or an access network (AN) 5-02, such as a Wi-Fi network, specified in a non-3GPP standard. The 5G CN is divided into a control plane (CP) function for transmitting control signals and a UP for transmitting data traffic.

The CP function includes a part shared by all slices (shared CH CP functions) 5-03 and parts belonging to specific slices (slice specific CN CP and UP functions) 5-04 and 5-05. The UP functions may belong to specific slices.

In the initial access to the network, the terminal 5-01 sends a registration request message. The registration request message may include the information on the slice that the terminal 5-01 wants to use after attaching to the network.

The individual network entities illustrated in FIG. 5 select the entities supporting the corresponding slice and transmit the registration request message to the corresponding selected entity based on the corresponding slice information. After attaching to the network, the terminal 5-01 may transmit a PDU session setup request message for data transmission. In order to notify the slice corresponding to the requested PDU session, the session setup request message may include the slice information.

If the session setup request message is received, the shared CN CP function 5-03 may select a slice-specific CN CP 5-04 or 5-05 based on the requested slice information. The aforementioned slice information may be a value that can be understood by all mobile communication operators or an arbitrary value determined by a specific mobile communication operator.

Figure 6:
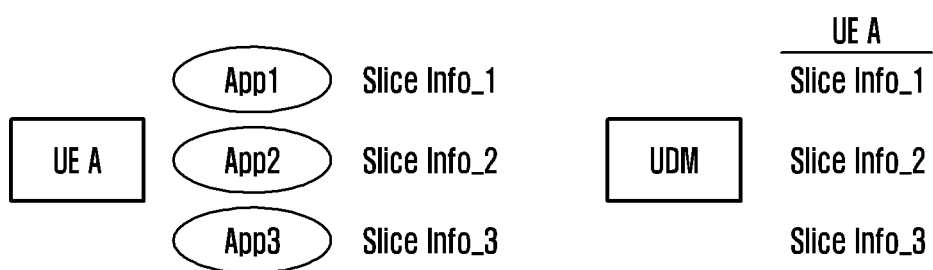
FIG. 6 illustrates slice-related information stored in a terminal and a home public land mobile network (HPLMN) according to an embodiment.

FIG. 6 illustrates information stored in a terminal and an HPLMN according to an embodiment.

Referring to FIG. 6, the terminal may subscribe to the HPLMN to use a specific slice. The terminal has the information on the slice to use, and the slice information may be stored in association with the applications running in the terminal in an application-specific manner. The HPLMN stores terminal-specific subscription information in a subscriber information database (UDM). For example, the UDM stores the subscription information of UE A, and the subscription information may include the slice information available for use by the UE A.

Figure 7:
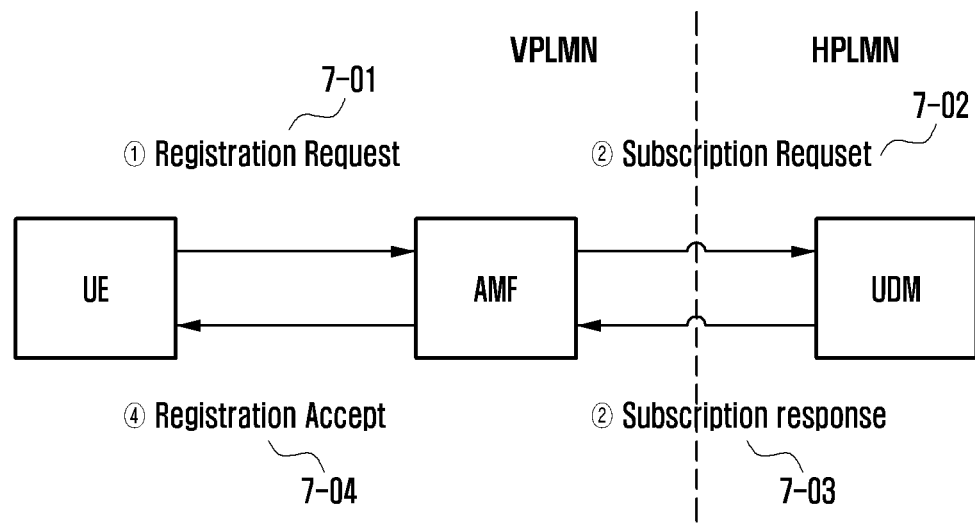
FIG. 7 illustrates a registration procedure for a terminal to connect to a roaming network rather than an HPLMN according to an embodiment.

FIG. 7 illustrates a terminal registration process in a roaming network according to an embodiment. Specifically, FIG. 7 illustrates a registration procedure for a terminal to connect to a roaming network, rather than an HPLMN.

Referring to FIG. 7, the terminal (UE) sends a registration request message for connection to a VPLMN at step 7-01. If the registration request message is received, an access and mobility management function (AMF) (corresponding to the shared CN CP function of FIG. 5) of the VPLMN connects to a UDM of the HPLMN to check the subscription information of the terminal at steps 7-02 and 7-03. The AMF determines whether to accept the request based on the subscription information received from the UDM and the local policy, and sends, at step 7-04, the terminal a registration accept message to permit connection. The information stored in the terminal and handled at the respective steps may vary depending on the operation of the network.

If the terminal has the slice information for use in the VPLMN before the attachment procedure, it sends the registration request message including requested slice info for the VPLMN at step 7-01. Upon receipt of the registration request message at step 7-01, the AMF determines whether the slice information included in the message indicates a slice of the VPLMN based on the local policy and roaming agreements. This step may be performed after step 7-03. The terminal checks the subscription information to determine whether the terminal has the right to use the corresponding slice through steps 7-02 and 7-03. Specifically, the AMF sends the UDM the requested slice info for the VPLMN information that has been transmitted by the terminal along with terminal information at step 7-02.

The UDM determines whether the terminal has the right to use the corresponding slice based on the subscription information of the terminal and the roaming agreements concluded between the HPLMN and VPLMN, and sends the AMF the slice information for use by the terminal in the VPLMN at step 7-03. The AMF may determine whether the slice info for the VPLMN that is received from the UDM indicates the slice currently available in the VPLMN based on the local policy and roaming agreements. The AMF sends the terminal a registration accept message including the finally determined allowed slice info for the VPLMN at step 7-04.

Alternatively, when the terminal has no slice information for use in the VPLMN before the attachment procedure, the terminal may transmit the registration request message with no slice information at step 7-01. Upon receipt of the registration request message at step 7-01, the AMF may check the slice available for the terminal as a subscriber of the HPLMN based on the local policy and roaming agreements. This step may be performed after step 7-03. It may also be possible to check the slice information for use by the terminal through steps 7-02 and 7-03.

Specifically, the AMF sends terminal information to the UDM at step 7-02. The UDM selects a slice available for use by the terminal based on the subscription information of the terminal and roaming agreements between the HPLMN and VPLMN. Since the terminal has not requested any slice at step 7-01, the HPLMN may select default slices based on the subscription information stored in the UDM.

The corresponding information may be the slice info for the HPLMN, rather than slice info for the VPLMN.

At step 7-03, the UDM sends the AMF the slice information (slice info for the HPLMN or slice info for the VPLMN) for use by the terminal in the VPLMN. If the slice info for the HPLMN is transmitted at step 7-03, the AMF may replace the slice info for the HPLMN that has been received from the UDM with the slice info for the VPLMN as a value corresponding to the VPLMN and determine whether the slice is currently available in the VPLMN.

The UDM may replace the selected slice info for the HPLMN with the slice info for the VPLMN value based on the roaming agreements and include the slice info for the VPLMN in the message of step 7-03. The AMF may determine whether the slice info for the VPLMN received from the UDM indicates a slice currently available in the VPLMN based on the local policy and roaming agreements. The AMF sends the terminal the registration accept message including the finally determined slice info for the VPLMN at step 7-04.

The registration accept message may include a "slice info for HPLMN" value corresponding to the slice info for the VPLMN. If the registration accept message is received, the terminal performs the operations of FIG. 8A. That is, the terminal may derive mapping information between the application running in the terminal and the S-NSSAI value for use in the VPLMN, using the mapping information between the application information stored in the terminal and the HPLMN NS-NSSAI and the mapping information between the slice info for the HPLMN (e.g., a set of S-NSSAIs) included in the registration accept message and the slice info for the VPLMN (e.g., a set of S-NSSAIs).

Since the terminal has not requested any slice at step 7-01, the slice allowed for use by the terminal at step 7-04 may be a default slice selected based on the subscription information stored in the UDM. Afterward, when the terminal requests for PDU session setup, the terminal sends the PDU session setup request message including the S-NSSAI value of the VPLMN mapped to the application.

When the terminal has no slice information available for use in the VPLMN before the attachment procedure, the terminal sends the registration request message including the requested slice info for the HPLMN at step 7-01.

Upon receipt of the registration request message at step 7-01, the AMF may send, at step 7-02, the UDM the subscription request message including the requested slice info for the HPLMN that has been received from the terminal. The UDM may finally select a slice for use by the terminal based on the subscription information and send the AMF the subscription response message including the allowed slice info for the HPLMN as the corresponding slice information at step 7-03. The AMF may replace the allowed slice info for the HPLMN with the slice info for the VPLMN as a value corresponding to the VPLMN based on the roaming agreements. The AMF may finally determine the allowed slice info for the VPLMN as the slice to be provided to the terminal based on the local policy. The AMF may send the terminal the registration accept message including the allowed slice info for the VPLMN and slice info for the HPLMN corresponding thereto at step 7-04.

After determining the allowed slice info for the HPLMN after step 7-02, the UDM may replace the allowed slice info for the HPLMN with the slice info for the VPLMN as a value for use in the VPLMN in the subscription response message of step 7-03. The AMF may finally determine the allowed slice info for the VPLMN as the slice to be provided to the terminal based on the local policy. The AMF sends the terminal the registration accept message including the allowed slice info for the VPLMN and the slice info for the HPLMN corresponding thereto at step 7-04.

At step 7-03 of FIG. 7, the UDM may generate the subscription response message including network requirement information (e.g., a quality of service (QoS) profile) to be provided to the terminal, but without any slice information.

Upon receipt of the corresponding information, the AMF may select a slice of the VPLMN meeting the requirements, i.e., the AMF determines the allowed slice info for the VPLMN and sends the registration accept message including the allowed slice info for the VPLMN to the terminal, at step 7-04.

Figure 8A:
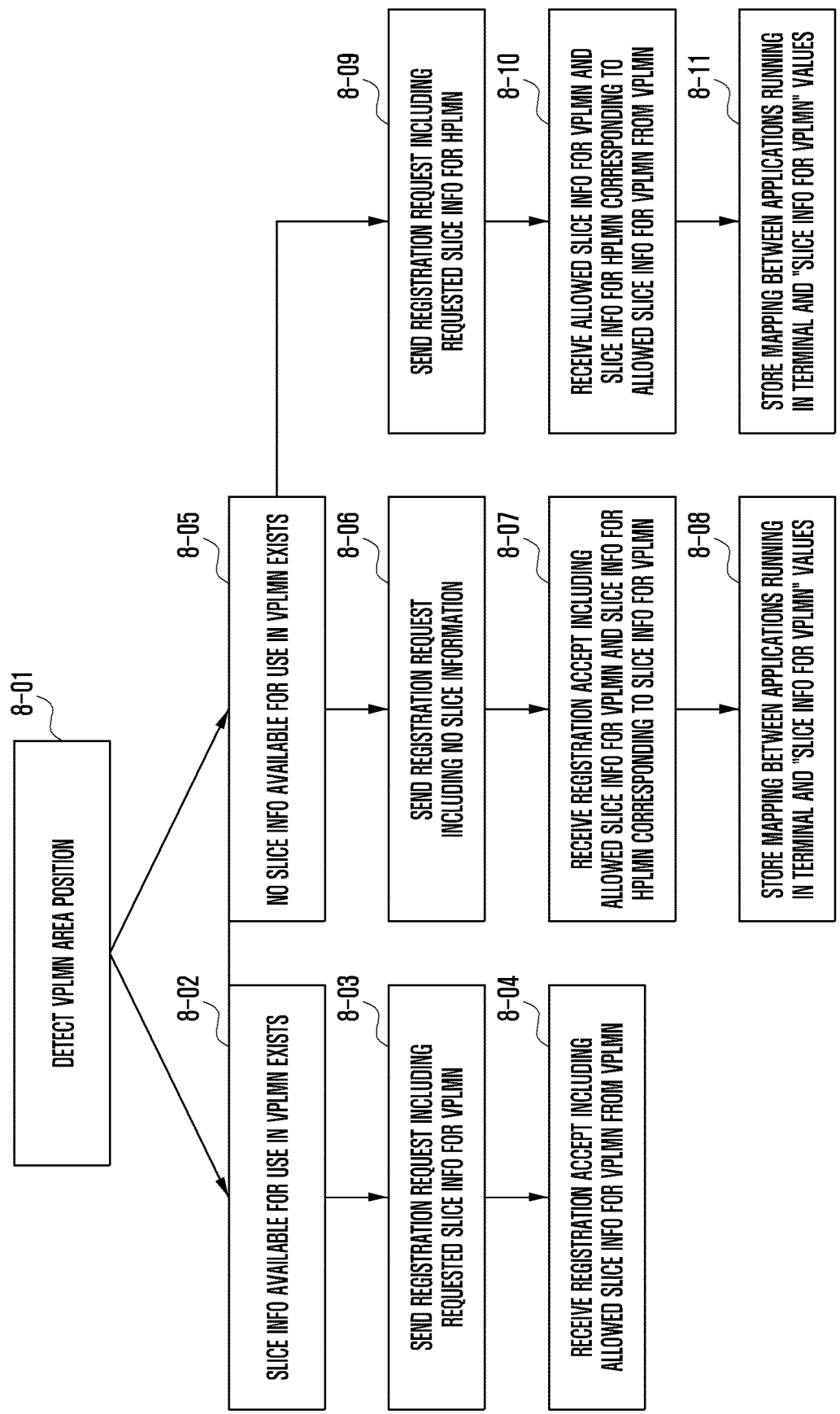
FIG. 8A is a flowchart illustrating a terminal operation and diagram illustrating change of information stored in the terminal according to an embodiment.

FIG. 8A is a flowchart illustrating a terminal operation and a change in information stored in the terminal according to an embodiment. Specifically, FIG. 8A illustrates a terminal operation of the embodiment illustrated in FIG. 7, and illustrates the change of the slice information stored in the terminal before and after registration, when the terminal has no slice information available for use in a VPLMN in the initial access procedure.

Referring to FIG. 8A, the terminal detects the position of the VPLMN area at step 8-01, and checks whether there is available slice info in the VPLMN.

At step 8-02, the slice information available in the VPLMN is available, and the terminal transmits a Registration Request message including the requested slice info for VPLMN at step 8-03 and receives, from VPLMN, a Registration Accept message including allowed slice information for VPLMN at step 8-04.

However, when there is no slice info available in the VPLMN at step 8-05, the terminal transmits a Registration Request message that does not include slice information at step 8-06, and receives allowed slice information and corresponding Registration Accept message including slice info for HPLMN from VPLMN at step 8-07. At step 8-08, the terminal maps and stores slice info for VPLMN values for each application stored in the terminal.

Alternatively, when there is no slice info available in the VPLMN at step 8-05, the terminal transmits a Registration Request message including the requested slice info for HPLMN at step 8-09 and receives allowed slice info for VPLMN and corresponding Registration Accept message including slice info for HPLMN at step 8-10. At step 8-11, the terminal maps and stores a slice info for VPLMN value for each application stored in the terminal.

Figure 8B:
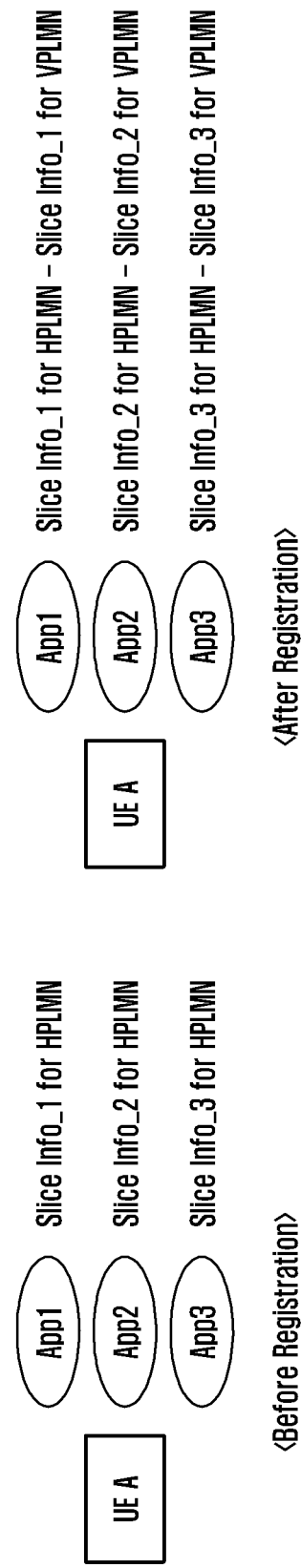
FIG. 8B illustrates slice-related information stored in a terminal, before and after registration, according to an embodiment.

FIG. 8B illustrates information stored in the terminal, before and after registration, according to an embodiment. Specifically, FIG. 8B schematically shows slice-related information stored for each in-terminal application.

Referring to FIG. 8B, before registration, the terminal stores slice information for the associated HPLMN for each application installed in the terminal. After registration, the terminal stores the slice information for the associated HPLMN and the slice information for the VPLMN mapped to the associated HPLMN.

FIG. 9 is a flowchart illustrating an operational flow of a VPLMN NF according to an embodiment. Specifically, FIG. 9 is a flowchart illustrating an AMF operation of the embodiment illustrated in FIG. 7.

Referring to FIG. 9, the AMF receives a Registration Request at step 9-01 and checks the Requested slice info at step 9-02.

If Requested slice info is a VPLMN value at step 9-02, the AMF transmits the requested slice for VPLMN information of the terminal to the HPLMN at step 9-03 and receives slice for VPLMN information at step 9-04. The AMF determines the allowed slice info for VPLMN at step 9-05, and transmits the allowed slice info for VPLMN to the terminal at step 9-06.

If there is no Requested slice info at step 9-02, the AMF transmits a request for a default slice information of the terminal to the HPLMN at step 9-07, receives the default slice information of the terminal at step 9-08, changes the HPLMN value to the VPLMN value at step 9-09, and determines the allowed slice info for the VPLMN at step 9-10. The AMF receives the default slice information of the terminal at step 9-08, and determines whether the default slice information is a VPLMN value or a network requirement at step 9-10. Thereafter, the AMF transmits an allowed slice info for the VPLMN and its corresponding slice info for the HPLMN to the terminal at step 9-11.

When the Requested slice info is an HPLMN value at step 9-02, the AMF transmits the Requested slice info for HPLMN information of the terminal to the HPLMN at step 9-12, receives the allowed slice information of the terminal at step 9-13, and if the allowed slice information is an HPLMN value, changes the HPLMN value to a VPLMN value at step 9-14, and determines an allowed slice info for the VPLMN at step 9-15. The AMF receives the allowed slice information of the terminal at step 9-13, and determines the allowed slice info for VPLMN when the allowed slice information is the VPLMN value or the network requirement at step 9-15. Thereafter, the AMF transmits an allowed slice info for the VPLMN and corresponding slice info for the HPLMN to the terminal at step 9-16.

Figure 10:
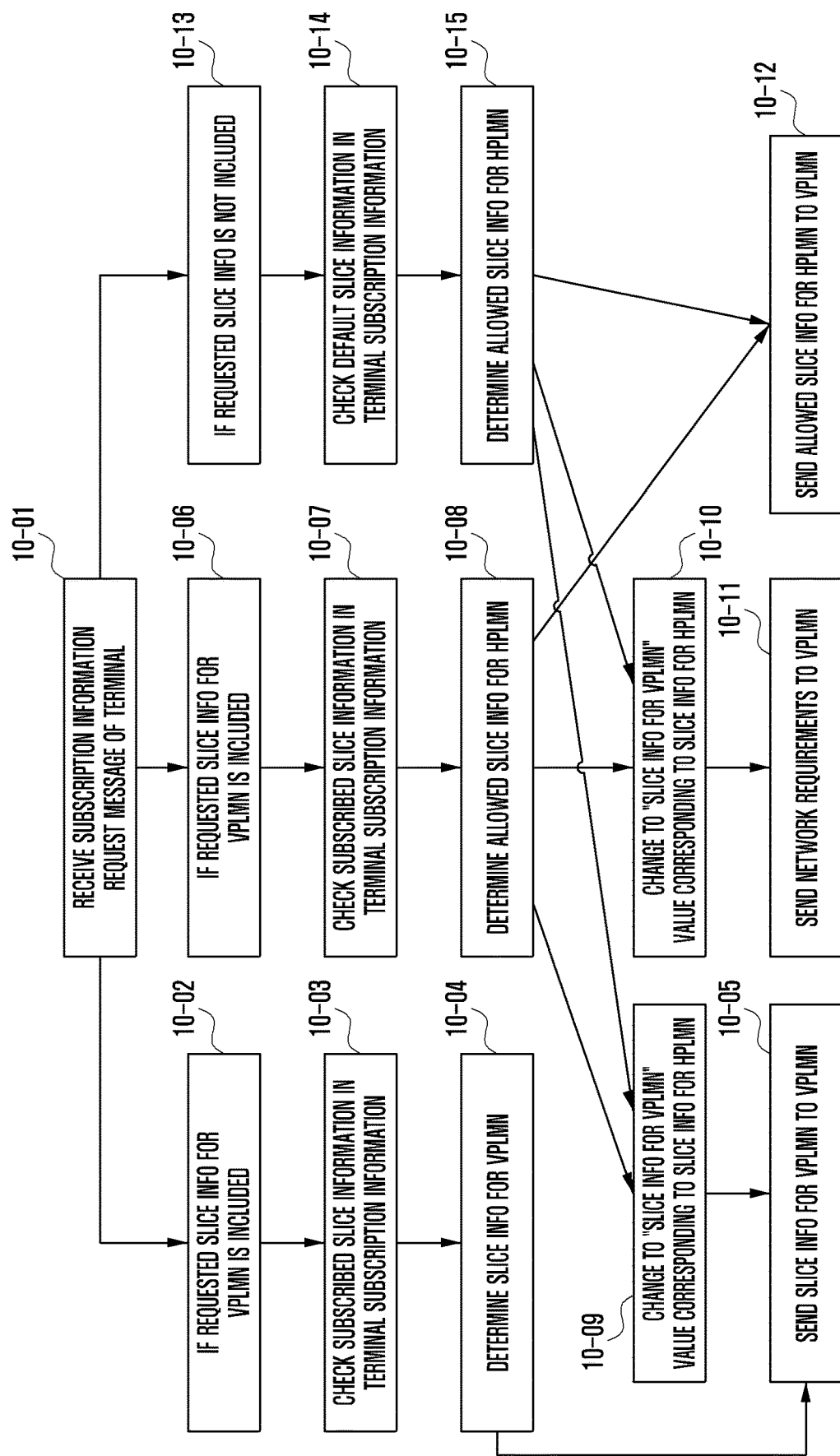
FIG. 10 is a flowchart illustrating an operation of an HPLMN NF according to an embodiment.

FIG. 10 is a flowchart illustrating an operation of an HPLMN NF according to an embodiment. Specifically, FIG. 10 is a flowchart illustrating a UDM operation of the embodiment illustrated in FIG. 7.

Referring to FIG. 10, the UDM receives the subscription information request message of the terminal at step 10-01 and confirms the subscription information request message.

The subscription information request message includes the requested slice info for the VPLMN at step 10-02, and the UDM checks subscribed slice information in the subscription information of the terminal at step 10-03. The UDM determines slice info for the VPLMN at step 10-04 and transmits the slice info for the VPLMN to the VPLMN at step 10-05.

The subscription information request message includes the Requested slice info for HPLMN at step 10-06, and the UDM checks the subscribed slice information in the subscription information of the terminal at step 10-07 and determines the Allowed slice info for the HPLMN at step 10-08.

After step 10-08, the UDM may determine the slice info for the VPLMN value corresponding to slice info for the HPLMN at step 10-09, and transmit the slice info for the VPLMN to the VPLMN at step 10-05.

After step 10-08, the UDM may determine network requirements corresponding to slice info for the HPLMN at step 10-10 and transmit network requirements to VPLMN at step 10-11.

After step 10-08, the UDM can transmit the allowed slice info for the HPLMN to the VPLMN at step 10-12.

The Requested slice info is not included in the subscription information request message at step 10-13, and the UDM checks default slice information in the subscription information of the terminal at step 10-14. The UDM can determine the allowed slice info for the HPLMN at step 10-15 and transmit the allowed slice for the HPLMN to the VPLMN at step 10-12.

Figure 11:
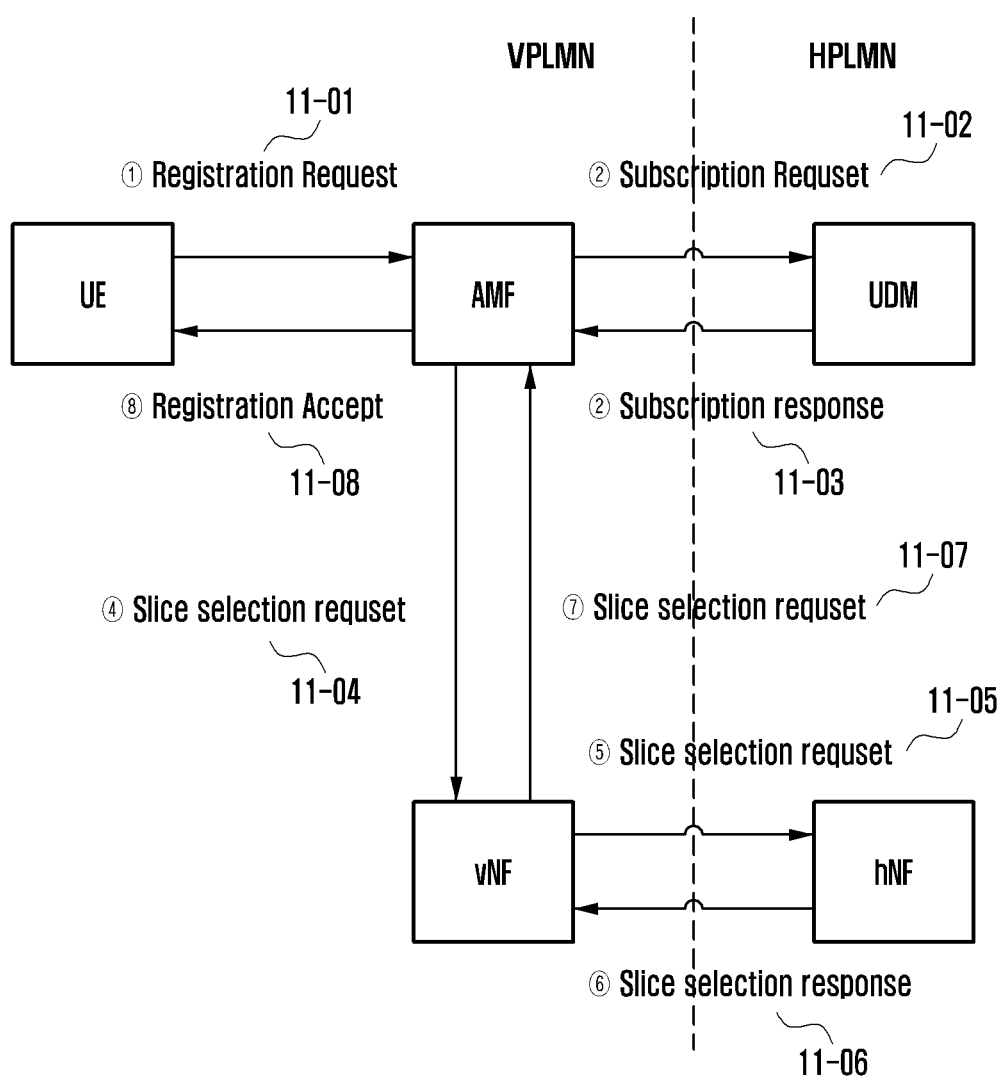
FIG. 11 illustrates a procedure for registering a terminal with a roaming network according to an embodiment.

FIG. 11 illustrates a terminal registration process in a roaming network according to an embodiment. Specifically, FIG. 11 illustrates a slice selection and mapping operation being performed by a network function, rather than an AMF and UDM in the embodiment illustrated in FIG. 7.

Referring to FIG. 11, the terminal (UE) sends a registration request message for connection to a VPLMN at step 11-01, the AMF sends the UDM a subscription request at step 11-02, and the UDM sends the AMF a subscription response at step 11-03

The AMF sends to a vNF the slice information requested by the terminal at step 11-04. The vNF may be a network slice selection function for administrating network slices of the VPLMN or a network repository function for administrating network nodes of the VPLMN.

At steps 11-05 and 11-06, the vNF determines a slice available for use by the terminal by communicating with an hNF. The hNF may be a network slice selection function for administrating network slices of the HPLMN, a network repository function for administrating network nodes of the HPLMN, or a UDM for managing subscriber information.

According to another embodiment, steps 11-02 and 11-03 may be performed after step 11-07.

After obtaining the allowed slice info for the VPLMN that is available for use in the VPLMN through the registration procedure, the terminal uses this value in the subsequent session setup procedure.

Figure 12A:
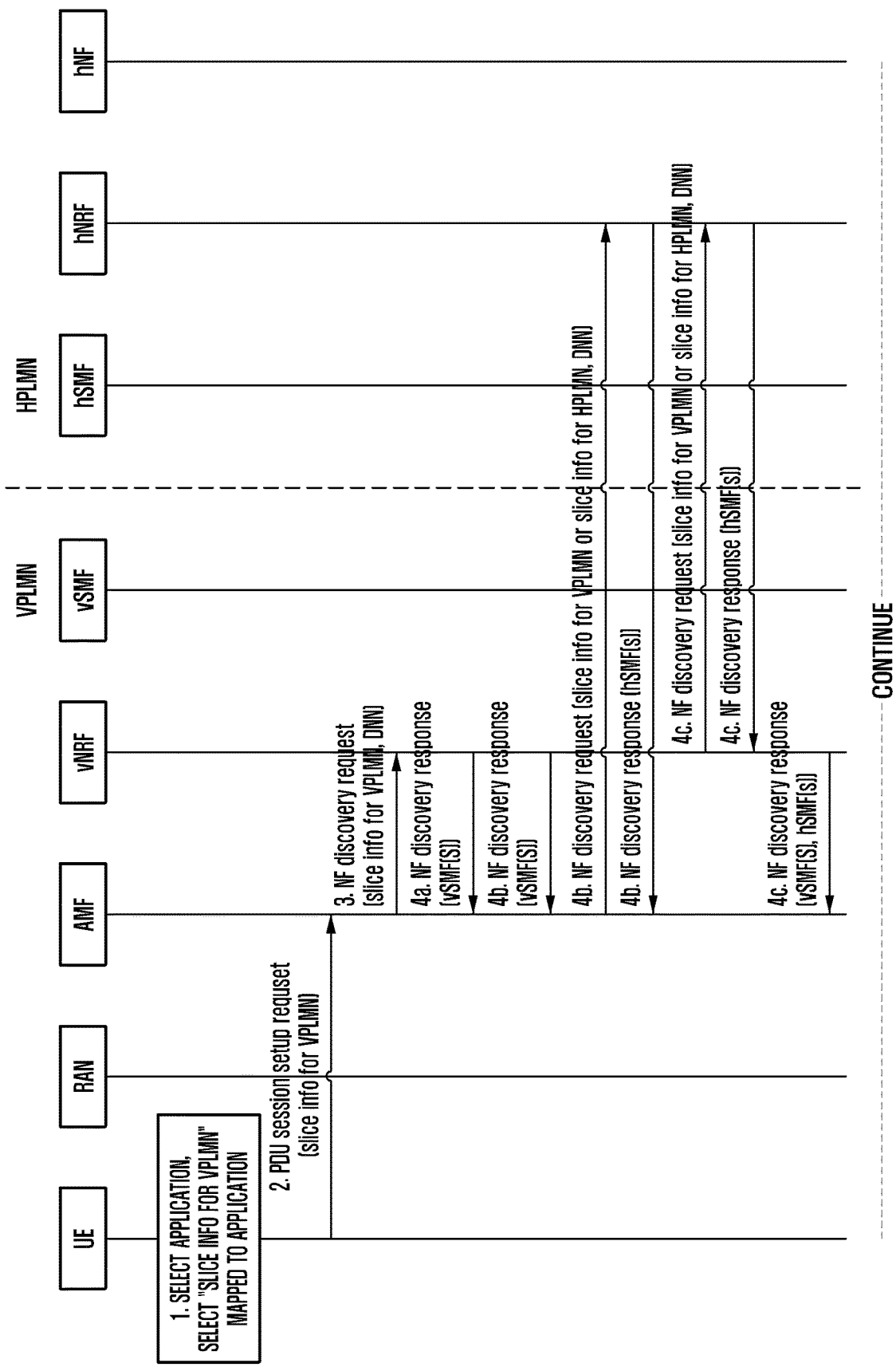
FIGS. 12A and 12B are a signal flow diagram illustrating a session setup procedure in a roaming network according to an embodiment.
Figure 12B:
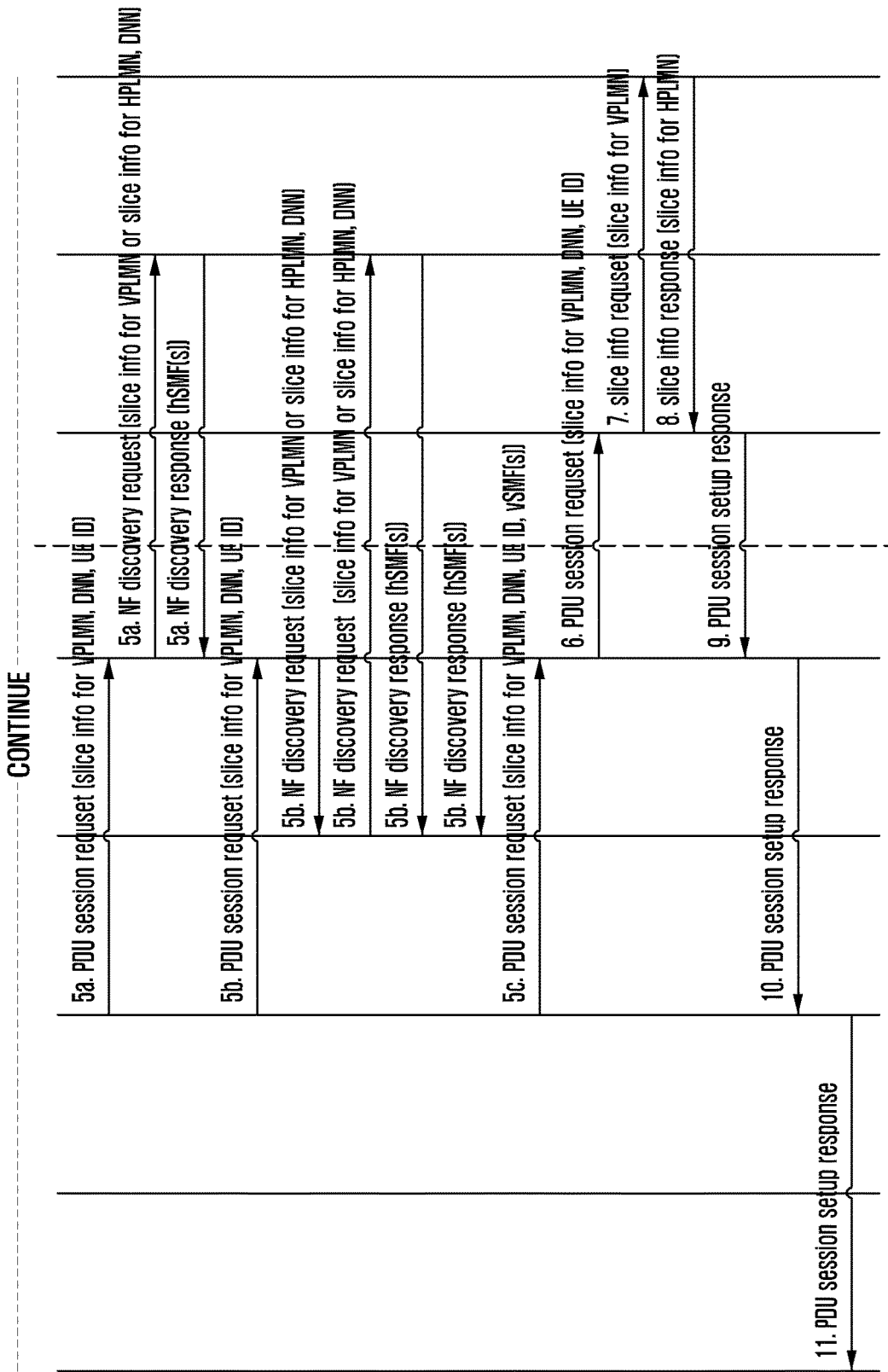

FIGS. 12A and 12B are a signal flow diagram illustrating a PDU session setup procedure in a roaming network according to an embodiment.

Referring to FIG. 12A, the terminal (or UE) checks (or selects) the "slice info for VPLMN" value mapped to the application that a user wants to use. If there is no PDU session corresponding to the slice or, even if there is, it is not possible to use the PDU session, the terminal transmits a new PDU session setup request message to the network at step 2. Specifically, the PDU session setup request message including the "slice info for VPLMN" value is sent to the AMF.

The AMF sends, at step 3, the visiting network resource function (vNRF) an NF discovery request message to search for an SMF supporting the corresponding slice.

Three types of operations are possible after step 3.

In the operation of step 4a, the vNRF receives an NF discovery response message including vSMF(s) information. The AMF sends the vSMF a PDU session setup request message without knowing the hSMF information of the HPLMN. After the operation of step 4a, operations 5a and 5b are possible.

In the operation of step 4b, the AMF that has received the vSMF(s) information through the NF discovery response message inquires to the hNRF of the HPLMN about the hSMF(s) information.

In the operation of step 4c, the vNRF that has received the NF discovery request message at step 3 communicates with the hNRF to acquire the hSMF(s) information and sends the AMF an NF discovery response message including the vSMF(s) information and hSMF(s) information.

Referring to FIG. 12B, after acquiring the vSMF(s) information through steps 4a to 4c, the AMF selects one of the vSMF(s) and sends a PDU session setup request message to the selected vSMF at steps 5a to 5c.

Upon receipt of the PDU session setup request message, the vSMF may perform three types of operations.

In the operation of step 5a, the vSMF requests, from the hNRF, the information on the hSMF(s) capable of providing the corresponding slice when no hSMF(s) information is received from the AMF. If the hSMF(s) information is acquired, the vSMF selects one of the hSMF(s) and sends the PDU session setup request message to the selected hSMF at step 6.

In the operation of step 5b, the vSMF obtains the hSMF(s) information through the vNRF without direct communication with the hNRF. If the hSMF(s) information is acquired, the vSMF selects one of the hSMF(s) and sends the PDU session setup request message to the selected hSMF at step 6.

In the operation of step 5c, the AMF obtains the hSMF(s) information through the operation of step 4b or 4c and sends the hSMF(s) information to the vSMF. Here, the AMF selects one of the hSMF(s) and sends the selected hSMF information to the vSMF, and the vSMF sends the PDU session setup request message to the corresponding hSMF at step 6. It may also be possible for the AMF to send the hSMF(s) information to the vSMF such that the vSMF selects one of the hSMF(s) and sends the PDU session setup request message to the selected hSMF at step 6. The PDU session setup request message may include a "slice info for VPLMN" value.

Upon receipt of the PDU session setup request message, the hSMF communicates, if necessary, with the hNF to acquire a "slice info for HPLMN" value mapped to the slice info for VPLMN, at steps 7 and 8.

The vNF taking charge of this role may be a network slice selection function (NSSF), an NRF, a UDM, or another network entity composing the 5G CN.

A PDU session setup response message is delivered to the terminal through steps 9 to 11.

Figure 13:
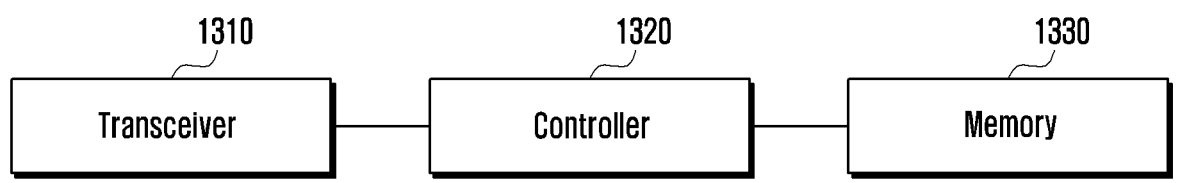
FIG. 13 illustrates a network entity according to an embodiment.

FIG. 13 illustrates a network entity according to an embodiment. The network entity may refer to each configuration illustrated in FIGS. 1 to 12. For example, referring to FIG. 1, the network entity may be a base station (RAN), UPF, SMF, MMF, etc.

Referring to FIG. 12A, the network entity may be a RAN, AMF, vNRF, vSMF, hSMF, hNRF, hNF, etc.

Referring to FIG. 13, the network entity includes a transmission/reception unit (or transceiver) 1310, a control unit (or controller) 1320, and a storage unit (or memory) 1330. The control unit may be defined as a circuit or an application specific integrated circuit or at least one processor.

The transmission/reception unit 1310 may transmit and receive signals to or from a terminal or another network entity. The control unit 1320 may control the overall operation of the network entity according to the above-described embodiments of the present disclosure. For example, the control unit 1320 may control the signal flow between each block to perform the operation according to the flowcharts described above.

The storage unit 1330 may store at least one of information transmitted and received through the transmission/reception unit 1310 and information generated through the control unit 1320.

Figure 14:
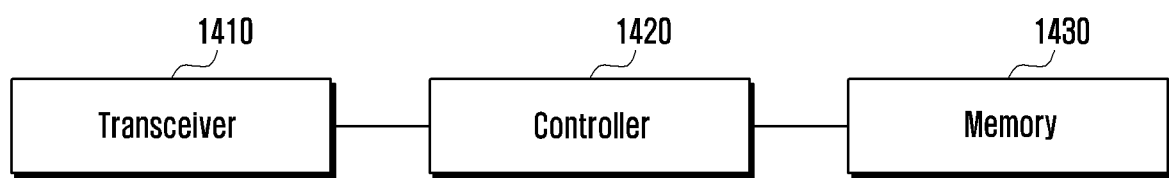
FIG. 14 illustrates a terminal according to an embodiment.

FIG. 14 is a diagram illustrating a structure of a terminal according to an embodiment.

Referring to FIG. 14, the terminal includes a transmission/reception unit (or transceiver) 1410, a control unit (or controller) 1420, and a storage unit (or memory) 1430. The control unit may be defined as a circuit or an application specific integrated circuit or at least one processor.

The transmitting/receiving unit 1410 may transmit and receive signals with other network entities. The transmitting/receiving unit 1410 may receive system information from a base station, and may receive a synchronization signal or a reference signal.

The control unit 1420 can control the overall operation of the terminal according to the above-described embodiments of the present disclosure. For example, the control unit 1420 may control the signal flow between each block to perform the operation according to the flowcharts described above.

The storage unit 1430 may store at least one of information transmitted and received through the transmitting/receiving unit 1410 and information generated through the control unit 1420.

As described above, the present disclosure is advantageous in terms of facilitating operations of network entities and managing network resources efficiently in various environments by allowing the devices taking charge of network functions configured by a mobile communication operator to exchange signaling of a terminal in a mobile communication operator network.

Also, the present disclosure is advantageous in terms of allowing the mobile communication operators that have concluded a roaming agreement to share slice information in a wireless communication system. Also, the present disclosure is advantageous in that a terminal can obtain the slice information for use in a roaming network and provide the information on how to manage and use the slice information of the roaming network.

In the above-described embodiments of the present disclosure, components are described in singular or plural forms depending on the embodiment. However, the singular and plural forms are selected appropriately for the proposed situation for explanatory convenience without any intention of limiting the present disclosure thereto; thus, the singular form includes the plural forms as well, unless the context clearly indicates otherwise.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method performed by an access and mobility management function (AMF) entity of a visited public land mobile network (VPLMN) in a communication system, the method comprising:
    receiving, from a terminal, a registration request message including information on at least one requested network slice selection assistance information (NSSAI) associated with a home public land mobile network (HPLMN);
    determining at least one allowed NSSAI associated with the VPLMN based on the at least one requested NSSAI associated with the HPLMN; and
    transmitting, to the terminal, a registration accept message as a response to the registration request message, the registration accept message including information on the at least one allowed NSSAI associated with the VPLMN.

2. The method of claim 1, wherein the registration accept message further includes information on at least one NSSAI associated with the HPLMN mapped to the at least one allowed NSSAI associated with the VPLMN.

3. The method of claim 1, wherein determining the at least one allowed NSSAI associated with the VPLMN comprises:
    transmitting, to a user data management (UDM) entity, a request message for requesting subscription data based on the registration request message;
    receiving, from the UDM entity, a response message as a response to the request message, the response message including information for slice selection; and
    determining the at least one allowed NSSAI associated with the VPLMN of the at least one requested NSSAI associated with the HPLMN based on at least one of the information for the slice selection or a policy.

4. The method of claim 1, wherein the registration request message includes the information on the requested NSSAI associated with the HPLMN in case that the terminal has no configured information on at least one NSSAI associated with the VPLMN.

5. The method of claim 1, further comprising receiving, from the terminal, a message for requesting a protocol data unit (PDU) session establishment, the message including information on at least one NS SAI determined based on the information on the at least one allowed NSSAI associated with the VPLMN.

6. A method performed by a terminal in a communication system, the method comprising:
    transmitting, to an access and mobility management function (AMF) entity of a visited public land mobile network (VPLMN), a registration request message including information on at least one requested network slice selection assistance information (NSSAI) associated with a home public land mobile network (HPLMN); and
    receiving, from the AMF entity, a registration accept message as a response to the registration request message, the registration accept message including information on at least one allowed NSSAI associated with the VPLMN based on the at least one requested NSSAI associated with the HPLMN.

7. The method of claim 6, wherein the registration accept message further includes information on at least one NSSAI with the HPLMN mapped to the at least one allowed NSSAI associated with the VPLMN.

8. The method of claim 6, wherein the at least one allowed NSSAI associated with the VPLMN of the at least one requested NSSAI associated with the HPLMN is determined by the AMF entity based on at least one of information for slice selection or a policy, and
    wherein the information for the slice selection is provided by a user data management (UDM) entity to the AMF entity.

9. The method of claim 6, wherein the registration request message includes the information on the requested NSSAI associated with the HPLMN in case that the terminal has no configured information on at least one NSSAI associated with the VPLMN.

10. The method of claim 6, further comprising transmitting, to the AMF entity, a message for requesting a protocol data unit (PDU) session establishment, the message including information on at least one NSSAI determined based on the information on the at least one allowed NSSAI associated with the VPLMN.

11. An access and mobility management function (AMF) entity of a visited public land mobile network (VPLMN) in a communication system, the AMF entity comprising:
    a transceiver; and
    a controller configured to:
        receive, from a terminal, via the transceiver, a registration request message including information on at least one requested network slice selection assistance information (NSSAI) associated with a home public land mobile network (HPLMN),
        determine at least one allowed NSSAI associated with the VPLMN based on the at least one requested NSSAI associated with the HPLMN, and
        transmit, to the terminal, via the transceiver, a registration accept message as a response to the registration request message, the registration accept message including information on the at least one allowed NSSAI associated with the VPLMN.

12. The AMF entity of claim 11, wherein the registration accept message further includes information on at least one NSSAI associated with the HPLMN mapped to the at least one allowed NSSAI associated with the VPLMN.

13. The AMF entity of claim 11, wherein the controller is further configured to:

transmit, to a user data management (UDM) entity, via the transceiver, a request message for requesting subscription data based on the registration request message, receive, from the UDM entity, via the transceiver, a response message as a response to the request message, the response message including information for slice selection, and determine the at least one allowed NSSAI associated with the VPLMN of the at least one requested NSSAI associated with the HPLMN based on at least one of the information for the slice selection or a policy.

14. The AMF entity of claim 11, wherein the registration request message includes the information on the requested NSSAI associated with the HPLMN in case that the terminal has no configured information on at least one NSSAI associated with the VPLMN.

15. The AMF entity of claim 11, wherein the controller is further configured to receive, from the terminal via the transceiver, a message for requesting a protocol data unit (PDU) session establishment, the message including information on at least one NSSAI determined based on the information on the at least one allowed NSSAI associated with the VPLMN.

16. A terminal in a communication system, the terminal comprising:

a transceiver; and a controller configured to:

transmit, to an access and mobility management function (AMF) entity of a visited public land mobile network (VPLMN), via the transceiver, a registration request message including information on at least one requested network slice selection assistance information (NSSAI) associated with a home public land mobile network (HPLMN), and receive, from the AMF entity, via the transceiver, a registration accept message as a response to the registration request message, the registration accept message including information on at least one allowed NSSAI associated with the VPLMN based on the at least one requested NSSAI associated with the HPLMN.

17. The terminal of claim 16, wherein the registration accept message further includes information on at least one NSSAI with the HPLMN mapped to the at least one allowed NSSAI associated with the VPLMN.

18. The terminal of claim 16, wherein the at least one allowed NSSAI associated with the VPLMN of the at least one requested NSSAI associated with the HPLMN is determined by the AMF entity based on at least one of information for slice selection or a policy, and wherein the information for the slice selection is provided by a user data management (UDM) entity to the AMF entity.

19. The terminal of claim 16, wherein the registration request message includes the information on the requested NSSAI associated with the HPLMN in case that the terminal has no configured information on at least one NSSAI associated with the VPLMN.

20. The terminal of claim 16, wherein the controller is further configured to transmit, to the AMF entity via the transceiver, a message for requesting a protocol data unit (PDU) session establishment, the message including information on at least one NSSAI determined based on the information on the at least one allowed NSSAI associated with the VPLMN.

* * * * *